No. 659,617. Patented Oct. 9, 1900.
B. VON BÜLTZINGSLÖWEN.
MEANS FOR INSERTING SHIRRING STRINGS INTO INCANDESCENT MANTLES.
(Application filed Aug. 27, 1898. Renewed Feb. 24, 1900.)

(No Model.) 8 Sheets—Sheet 4.

WITNESSES:

INVENTOR
Bruno von Bültzingslöwen
BY Goepel + Raegener
ATTORNEYS.

No. 659,617. Patented Oct. 9, 1900.
B. VON BÜLTZINGSLÖWEN.
MEANS FOR INSERTING SHIRRING STRINGS INTO INCANDESCENT MANTLES.
(Application filed Aug. 27, 1898. Renewed Feb. 24, 1900.)
(No Model.) 8 Sheets—Sheet 5.
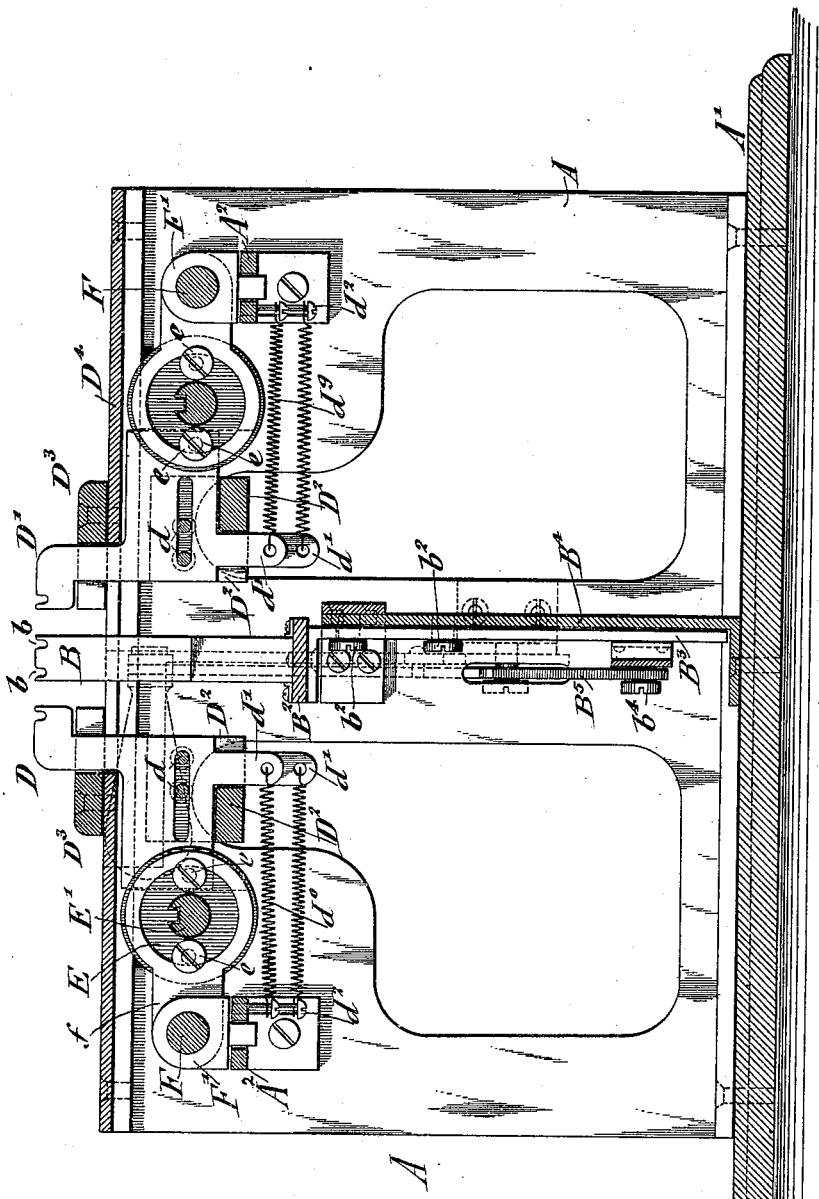
WITNESSES:
INVENTOR
Bruno von Bültzingslöwen
BY
Goepel & Raegener
ATTORNEYS.

No. 659,617. Patented Oct. 9, 1900.
B. VON BÜLTZINGSLÖWEN.
MEANS FOR INSERTING SHIRRING STRINGS INTO INCANDESCENT MANTLES.
(Application filed Aug. 27, 1898. Renewed Feb. 24, 1900.)
(No Model.) 8 Sheets—Sheet 6.
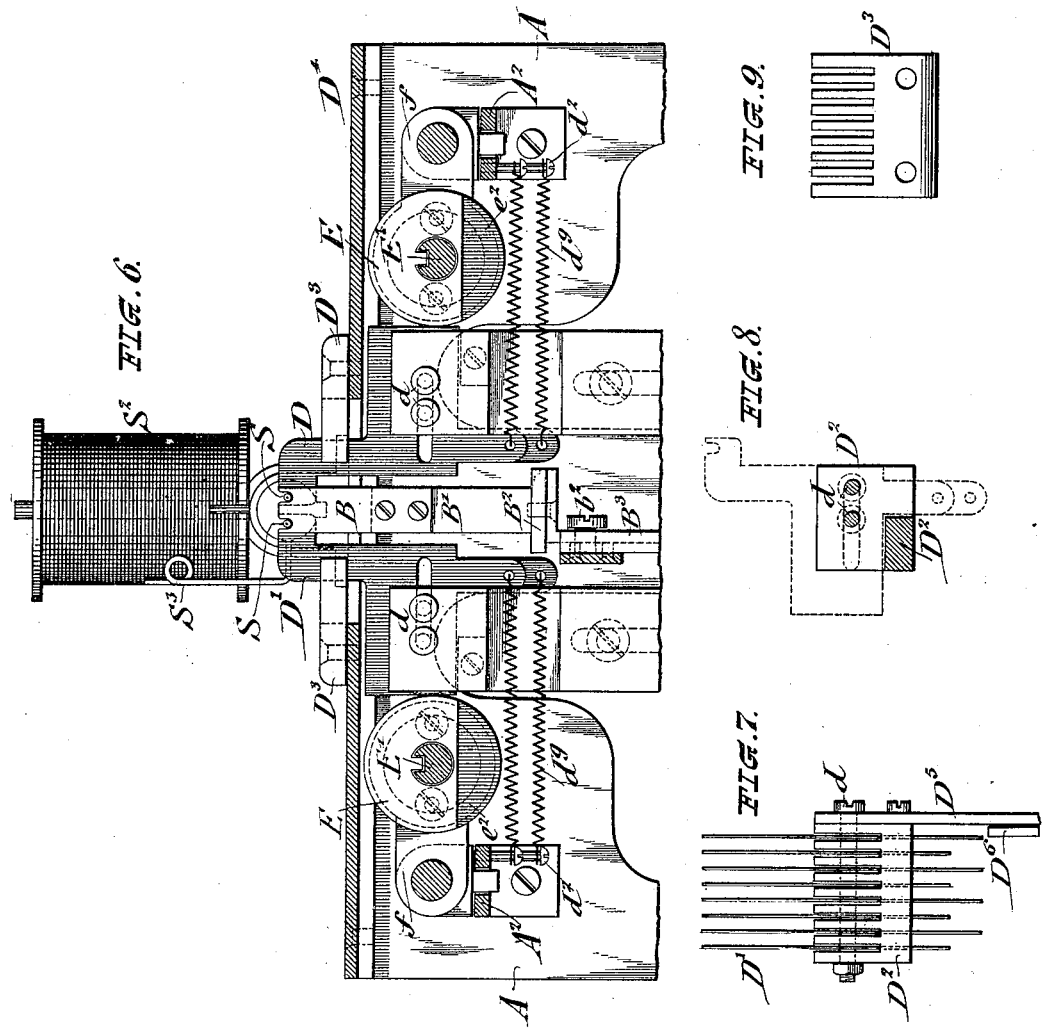

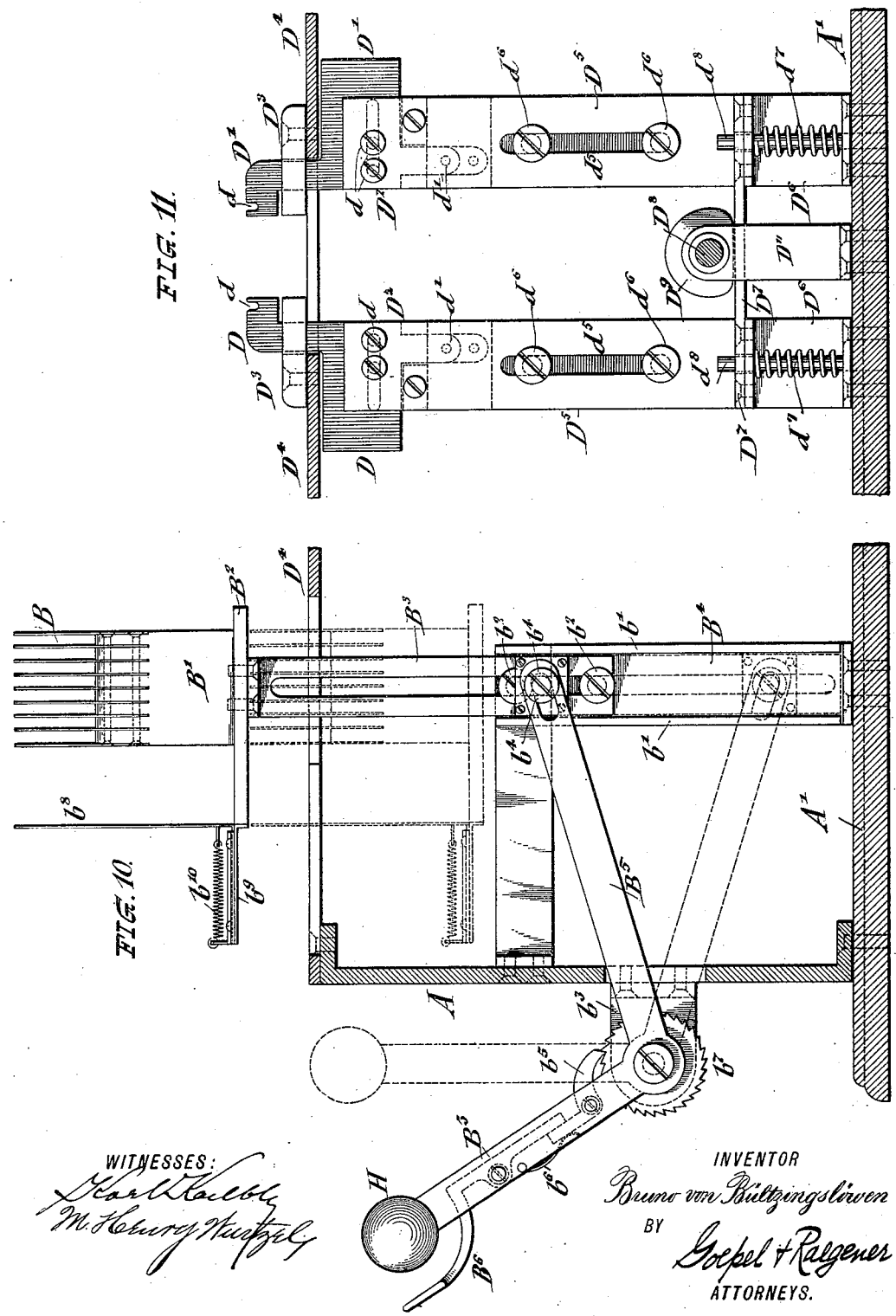

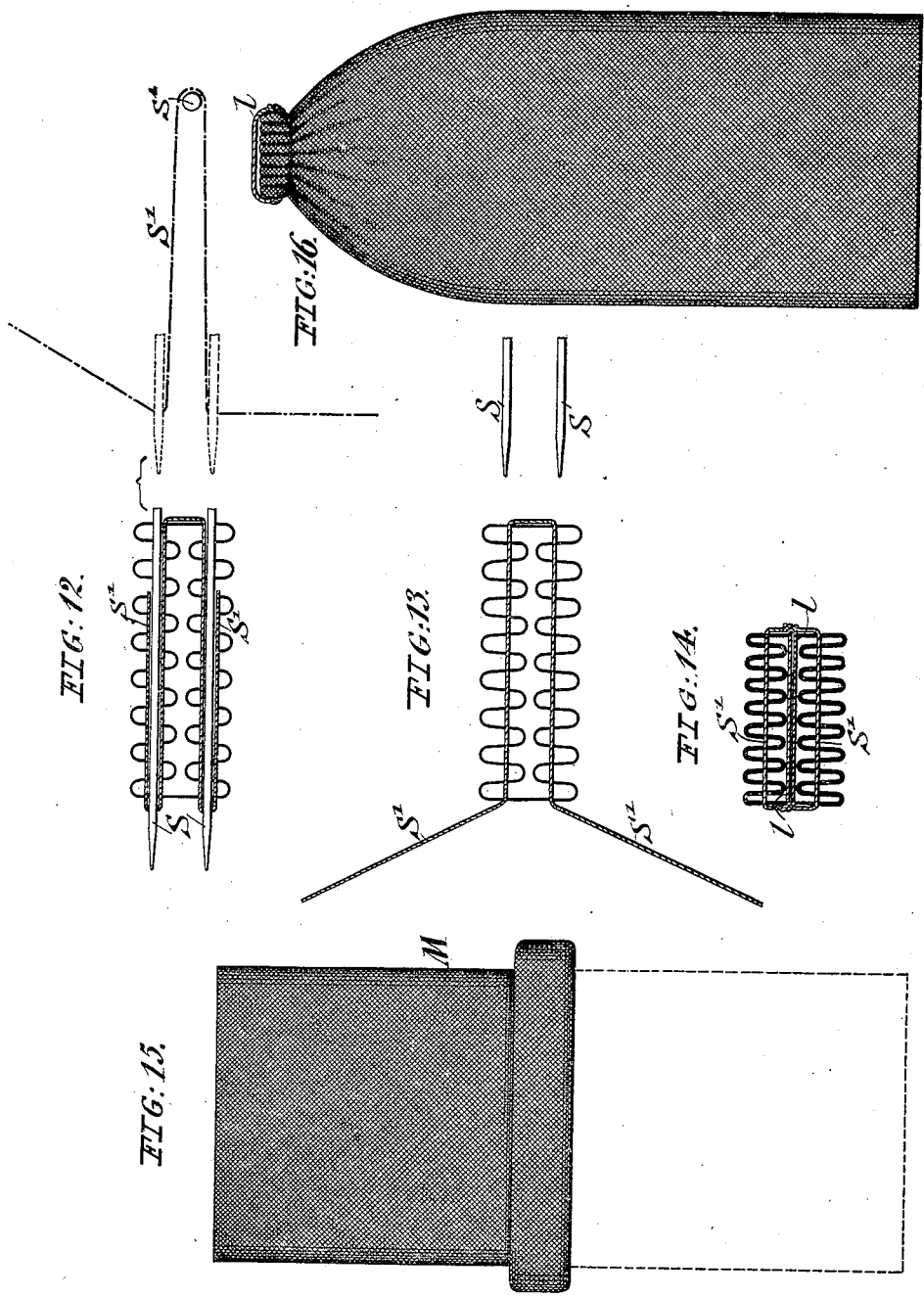

UNITED STATES PATENT OFFICE.

BRUNO VON BÜLTZINGSLÖWEN, OF NEW YORK, N. Y., ASSIGNOR OF ONE-THIRD TO SARAH VON AUW, OF SAME PLACE.

MEANS FOR INSERTING SHIRRING-STRINGS INTO INCANDESCENT MANTLES.

SPECIFICATION forming part of Letters Patent No. 659,617, dated October 9, 1900.

Application filed August 27, 1898. Renewed February 24, 1900. Serial No. 6,411. (No model.)

*To all whom it may concern:*

Be it known that I, BRUNO VON BÜLTZINGSLÖWEN, a citizen of Germany, residing in the city of New York, borough of Manhattan, State of New York, have invented certain new and useful Improvements in Means for Inserting Shirring-Strings into Incandescent Mantles, of which the following is a specification.

This invention relates to an improved means for inserting shirring-strings into mantles for incandescent gas or other lamps, so as to dispense with the hand-labor heretofore required for this purpose and permit the finishing of the head of the mantle and the tying of the asbestos thread or wire in the folds of the same in a quicker, cheaper, and more uniform manner than by hand; and the invention consists of a machine for folding and shirring the heads of mantles for incandescent gas-burners, said machine comprising two sets of side folders arranged at opposite sides of the mantle-blank, a set of central folders, both side folders and central folders being provided with recesses at their inner edges, means for applying successively one side folder after the other to the blanks for the mantles, so as to produce the successive folding up of the same, means for simultaneously moving needles through the folds of the mantle formed by the folders, and guide devices for the asbestos threads or wire passing through the eyes of the needles by which the folded and shirred blank is finally tied; and the invention consists, further, of certain details of construction which will be fully described hereinafter and finally pointed out in the claims.

Figure 1:
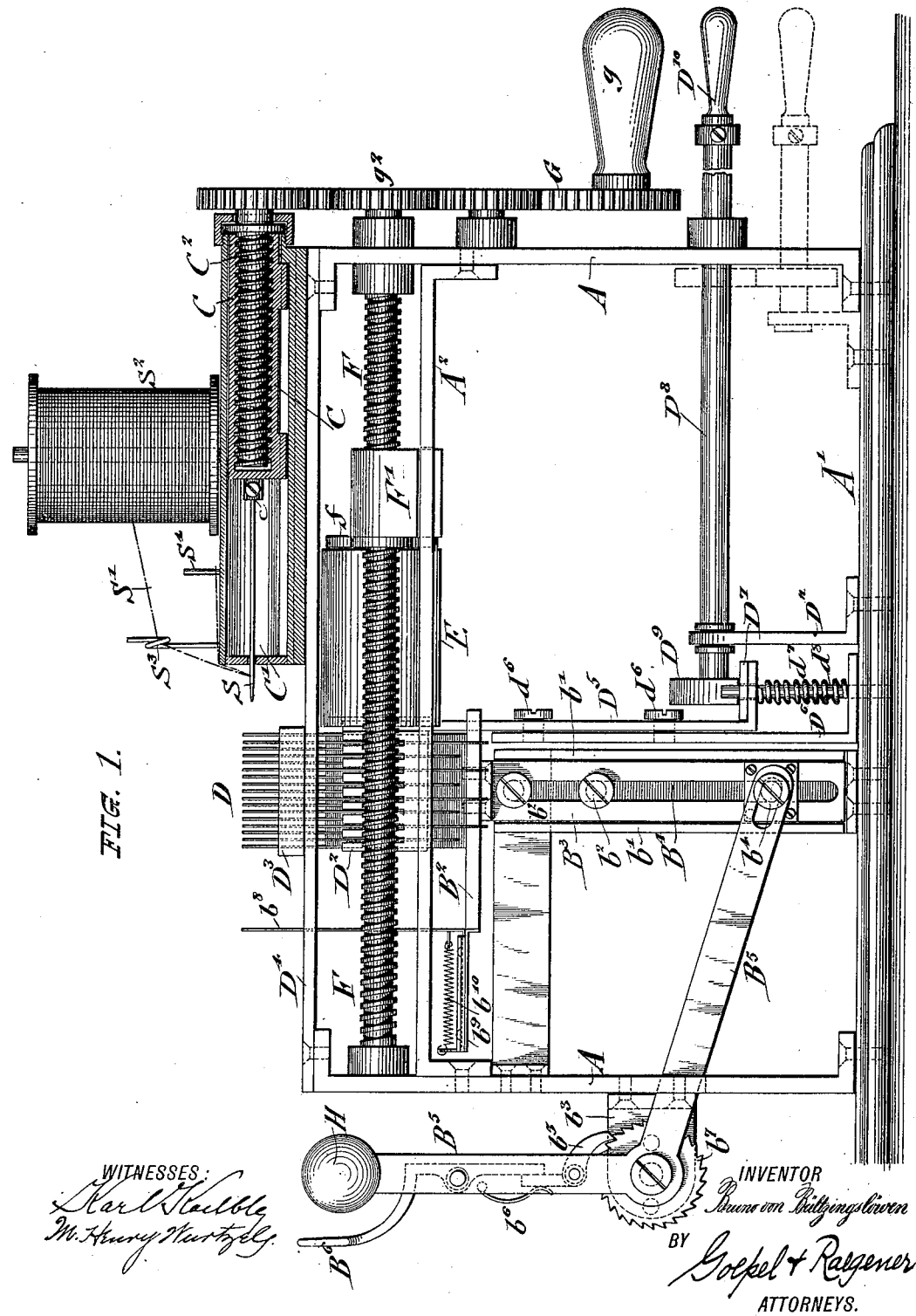
Figure 2:
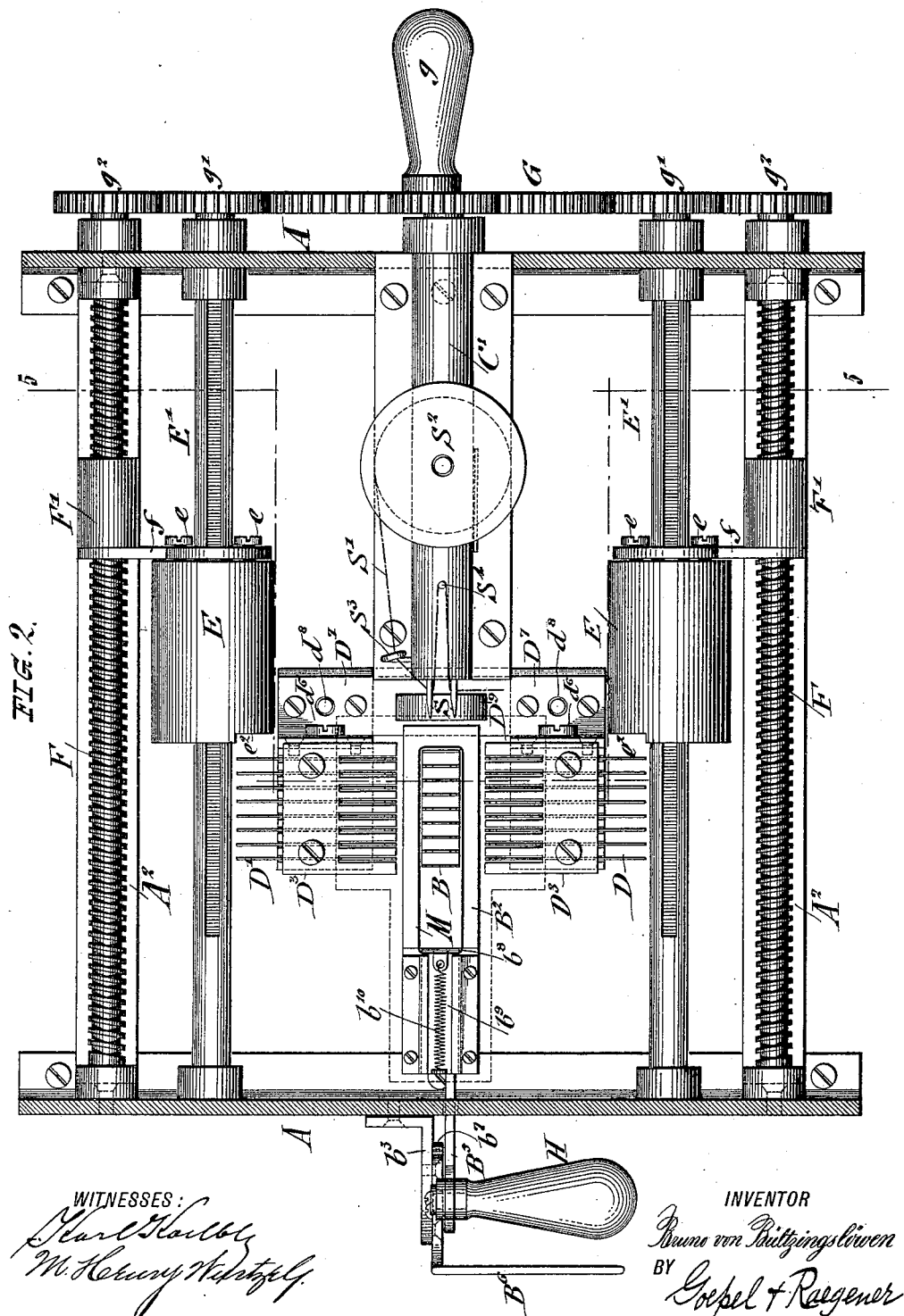
Figure 3:
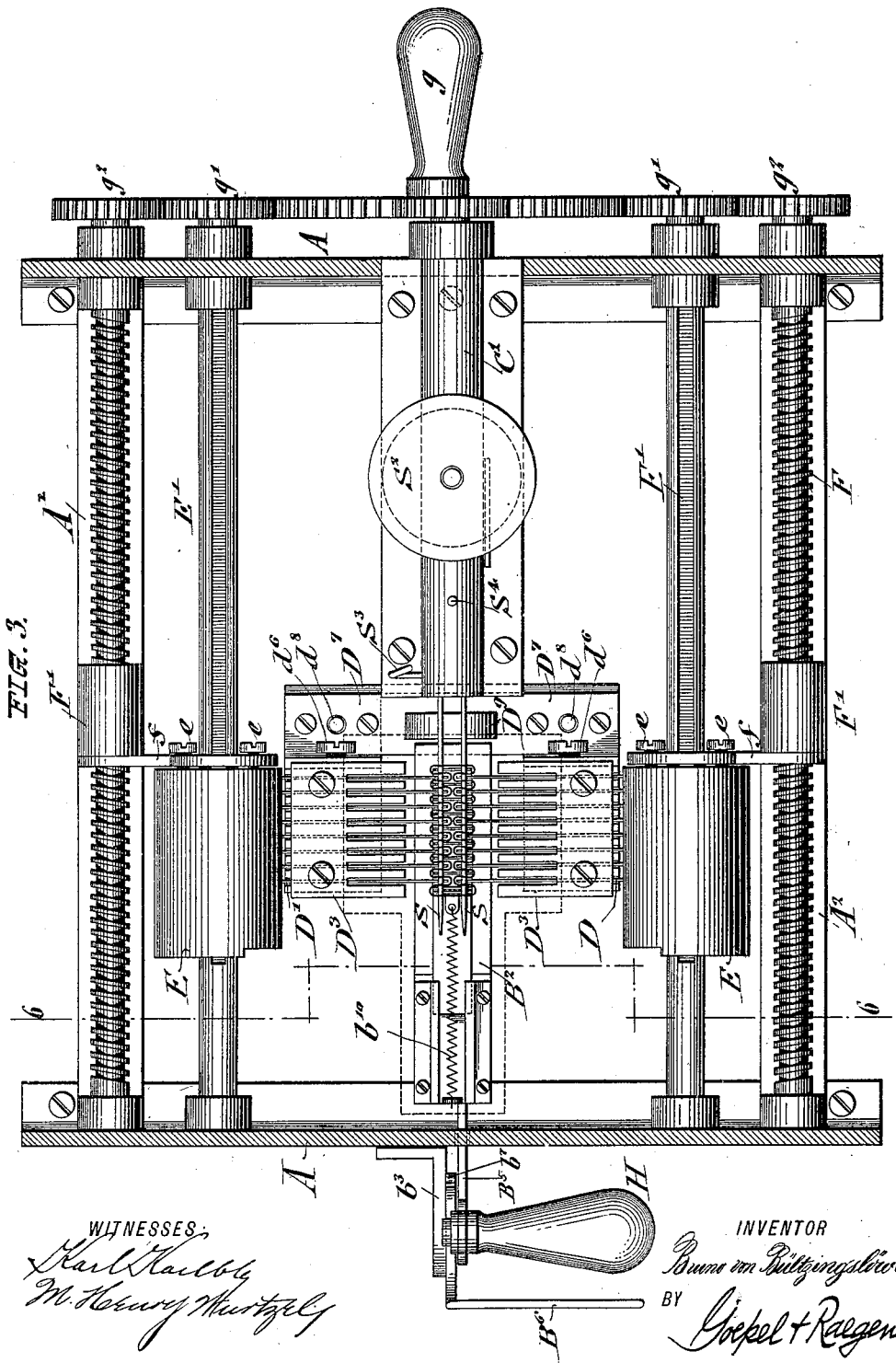
Figure 4:
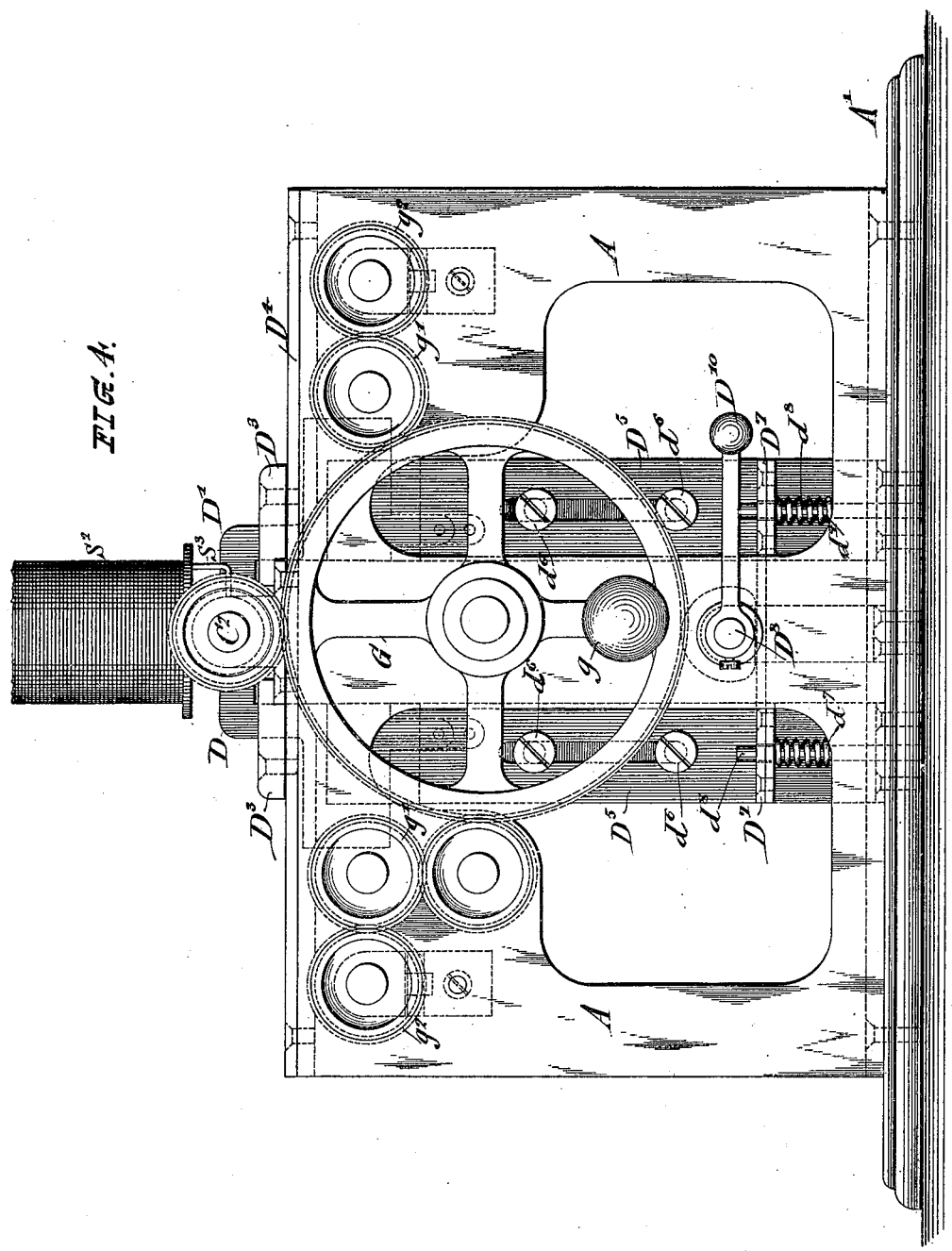

In the accompanying drawings, Figure 1 represents a side elevation of my improved means for inserting shirring-strings into the heads of mantles for incandescent lamps, partly in vertical section through the needle-bar and its guide-casing, the parts being in the position before the folding and shirring action commences. Fig. 2 is a plan view of Fig. 1. Fig. 3 is likewise a plan view showing the parts in position after the folding and shirring of the head of the mantle has been completed. Fig. 4 is an end elevation of the machine, showing the driving mechanism of the same. Fig. 5 is a vertical transverse section on line 5 5, Fig. 2. Fig. 6 is a vertical transverse section on line 6 6, Fig. 3. Fig. 7 is a detail side view of one set of side folders. Fig. 8 is a detail side view of one of the comb-shaped holders for the side folders. Fig. 9 is a top view of one of the comb-shaped guides for guiding the side folders. Fig. 10 is a sectional side elevation of one end of the machine, showing the central folders in raised position for receiving the mantle-blank preparatory to folding and shirring the same. Fig. 11 is a vertical transverse section of the side folders and their supporting-frame, showing the mechanism for lowering the folders after the side folders and needles are withdrawn from the shirred mantle, so as to crease the folds and facilitate the removal of the folded and shirred mantle. Figs. 12, 13, and 14 are diagrammatic plan views showing the folded head of the mantle in the course of the shirring operation after the shirring-needles have been withdrawn from the same and after the head has been tied by the asbestos thread or wire, and Figs. 15 and 16 show the mantle-blank parallel to the side elevation of the folders before the same has been acted on by the folders and after the head of the mantle has been folded and shirred by the machine.

Similar letters of reference indicate corresponding parts.

Referring to the drawings, A represents the supporting-frame of my improved machine for folding and shirring the heads of mantles for incandescent gas-lamps. The frame A is composed of upright parallel plates that are attached to a suitable base-plate A' and connected at their upper ends and sides by suitable brace-pieces. The driving mechanism for the side folders and shirring-needles is arranged at one end of the frame A, while the mechanism by which the central folders are raised for receiving the mantles preparatory to folding and shirring the heads of the same is arranged on the opposite side of the machine.

The folding operation of the head of the mantle is accomplished by a set of central folders B, which are arranged parallel to each other on a suitable frame and at a suitable distance apart, so that the folds of the mantle may enter between them under the reciprocating action of the side folders. The central folders are supported in a comb-shaped holder B', that is attached to the platform B². The central folders B are made of somewhat less width than the width of the folded head of the mantle M and are provided at each corner with a recess $b$ for the passage of the shirring-needles S S. The platform B² is supported on a slotted slide-piece B³, which is guided in a stationary upright standard B⁴, having ways $b'$ for the guiding of the slide-piece B³, which latter is guided on headed studs $b^2$, attached to the upright standard B⁴, as shown in Figs. 1, 5, and 10. The central folders B can be raised so as to place the mantle-blank in position thereon, said raising motion being accomplished by means of an elbow-lever B⁵, that is fulcrumed to an exterior lug $b^3$ on the wall of the supporting-frame, as shown in Figs. 1 and 10. The inner end of the fulcrumed angular lever B⁵ is slotted and applied to a headed stud $b^4$ of the slide-piece B³, while the outer end of the angular lever is provided with a handle H for conveniently operating the same. By lowering the handle H the angular lever B⁵ is turned and the entire set of central folders B are raised into the position shown in Fig. 10. By returning the handle to its former position the central folders are lowered again into the position shown in Fig. 1 and in dotted lines in Fig. 10. The central folders are locked into raised position by means of a pawl-and-ratchet mechanism which is arranged on the pivot of the angular lever B⁵, the pawl $b^5$ being pivoted to the shorter arm of the angular lever and released against the tension of a spring $b^6$ from the teeth of the fixed ratchet-wheel $b^7$ by means of an auxiliary handle B⁶, which is fulcrumed to the shorter arm of the angular lever below the same, as shown clearly in Figs. 1 and 10. When the central folder is at its raised position, the pawl $b^5$ engages the ratchet-wheel $b^7$ on the pivot of the angular lever B⁵ and secures thereby the central folders B in the position in which they have been placed. When it is desired to lower the central folders B, the pawl $b^5$ has to be released by pressure on the auxiliary handle B⁶, so that the pawl is withdrawn from the ratchet $b^7$, after which the angular lever B⁵ can be returned into its normal lowered position, together with the central folders.

On the platform B², on which the central folders are supported, is arranged a blade $b^8$, parallel with the central folders B and which is provided at its lower end with an angularly-bent portion that is guided in ways of a bracket $b^9$, attached to the end of the platform B². This blade is connected by a spring $b^{10}$ with the outer end of the bracket $b^9$ and serves to hold the mantle-blank stretched in position on the central folders. The blank M is for this purpose rolled up at the lower end, as shown in Fig. 15, and placed over the central folders B and on the guided and spring-actuated blade $b^8$, which latter keeps the blank in stretched position, as shown in plan view in Fig. 2. By the folding action exerted on the blank M the blade is moved forward against the tension of the spring $b^{10}$ until it is finally moved up to the end of the central folders B, as will be described hereinafter.

*The side folders.*—At each side of the central folders B and intermediately to the same is arranged a set of reciprocating side folders D D', which are guided parallel with each other and with the central folders in suitable comb-shaped holders D² during the reciprocating motion which is imparted to them. The holders D² are connected by screw-bolts $d\,d$, which pass through slots in the lower oblong shanks of the folders D D'. The upper ends of the side folders D D' are made angular and projecting toward each other, as shown in Figs. 5, 6, and 11. The angular portions are guided in comb-shaped guides D³, which are attached by fastening-screws to the horizontal supporting-plate D⁴. The upper ends of the side folders D are provided near the edge with recesses $d$, corresponding in size to the recesses near the edges of the central folders B, so that when the reciprocating side folders are moved intermediately between the central folders the recesses $d$ are brought in line with the recesses $b$ of the central folders, and the stitching-needles S can be passed through the folds of the mantle without being impeded in their progress. The side folders are furthermore provided with downwardly-extending lugs $d'$ at the lower parts of the oblong shanks, which lugs are connected, by helical springs $d^9$, with stationary pins $d^2$ in braces A² of the supporting-frame A, said springs serving to return the side folders into their normal retracted position in the holders D² and guide-combs D³ when the pressure on the outer ends of their shanks is removed. In other words, the side folders are returned to their normal position by their helical springs ready for the next impulse of forward motion. The holders D² for the side folders are supported on upright slide-plates D⁵, which are guided by slots $d^5$ on headed studs $d^6$ of stationary upright standards D⁶, the lower ends of said slide-pieces being provided with angularly-bent bracket portions that are connected by a bridge-strap D⁷. Between the angularly-bent portions of the lower ends of the slide-plates D⁵ and of the standards D⁶ are interposed cushion-springs $d^7$, which are placed on pins $d^8$, which pass through the brackets and bridge-strap D⁷. Intermediately between the slide-plates D⁵ of the two sets of side folders a horizontal spindle D⁸ is arranged, which carries a cam D⁹, that acts on the bridge-strap D⁷ when the spindle is turned by the crank-handle D¹⁰, applied to its outer end. The spindle is journaled at its cam end in a suitable standard D¹¹. The turning of the cam D⁹ produces the lowering of the slide-pieces D⁵ against the tension of the springs $d^7$, and thereby the lowering of the upper ends of the side folders D D', so that the same produce the creasing of the folds and facilitate the removal of the folded and shirred mantle. The lowering of the reciprocating side folders takes place after the side folders and needles S are returned into their initial position by the reverse motion imparted to the cylindrical cams E, which govern the motion of the side folders and the screw-spindle by which the motion of the needles is controlled. As soon as the spindle $D^8$ has made one complete revolution the side folders are raised again into their normal position at both sides of the central folders ready for the next folding operation.

One pair of the reciprocating side folders are slowly moved forward under the action of the cylindrical cams E, that are splined into longitudinal shafts E', which are rotated by a gear-wheel transmission arranged at the end of the supporting-frame, said gear-wheels being driven by a rotating driving gear-wheel G, provided with a crank-handle $g$, as shown in Figs. 1 and 2. The gear-wheel transmission imparts simultaneously rotary motion in opposite direction to the cam-shaft E', and thereby to the cams E. Simultaneously with this rotary motion the cams E are moved slowly forward by the action of rotary screw-spindles F F, which are arranged parallel with the shafts E' and rotated by gear-wheels $g^3$ meshing with the gear-wheels $g'$ at the ends of the shafts E E'. Traversing sleeves F', guided in slotted braces $A^2$ of the frame A, are placed on the screw-spindles F and connected by straps $f$ with the rear ends of the cylindrical cams E E, as shown in Figs. 1 and 2, said straps being attached to the ends of the cam-cylinders by screws $e\,e$ of the cams. The forward end of the cylindrical cams E is provided with segmental recesses $e^2$, which are shown clearly in Fig. 6. The position of the cams in this figure is, however, slightly different from that shown in Fig. 3, on which this sectional view is taken. During the turning of the driving gear-wheel G the cylindrical cams E E are rotated and simultaneously moved forward by the action of the traversing sleeves F', which are actutated by the screw-spindles F, so that during the forward motion of the cams E one pair of side folders after the other is engaged by the cams and successively moved inwardly between the central folders, so as to produce the required folds in the head of the mantle-blank, as shown in Fig. 3. Simultaneously with the forward motion imparted to the side folders D D' two parallel shirring-needles S S are passed through the folds of the mantle-head. These shirring-needles are arranged parallel to each other in a cylindrical needle-bar C, which is guided in a cylindrical casing C', supported at the top of the frame A of the machine, said needle-bar C being made tubular and provided with an interior screw-thread which is engaged by a screw-spindle $C^2$, which receives rotary motion from the main driving-wheel G of the machine, as shown in Fig. 4. The needles being shorter and farther back than the cams E at their respective normal positions, they consequently pass into the folds of the mantle somewhat behind the movable side folders. The needles are so arranged that they are just two folds behind the cams E E. Consequently on going back they are two folds ahead of the cams. By the rotary motion imparted to the spindle $C^2$ longitudinal motion is imparted to the tubular needle-bar C, so that the two needles S S, supported in the sockets $c$ in the head of the same, are moved forward through openings in the guide-case C' of the same. The needles are threaded with asbestos thread or wire, which is passed from a spool $S^2$, supported on the cylindrical casing C', then over a suitable eye $S^3$ to one needle-eye, then over a center pin $S^4$ on the guide-casing C', and then to the second needle-eye, and made of sufficient length so that the thread is accurately passed through all the folds of the mantle as the needles pierce the same, as shown in Fig. 2. This piercing takes place with the successive folding of the mantle-blank by the combined action of the central and reciprocating side folders. The thread or wire is then cut, the needles unthreaded, the motion of the machine reversed, and the needles S S withdrawn from the folds of the mantle, after which the ends of the threads are drawn out, as shown in Fig. 13, and the same tied together, as shown clearly in Fig. 14, so as to form the loop $l$, by which the mantle is then supported from the crutch of the lamp.

Operation: My improved machine for folding and shirring the heads of mantles for incandescent gas-lamps is preferably operated by hand; but it can also be operated by foot or other power. Before setting the machine in motion the set of central folders B are raised above the level of the reciprocating side folders D D' by lowering the angular lever $D^5$ at one end of the machine, so that the central folders D and the tension-blade $b^8$, guided on the supporting-platform $B^2$ of the same, are placed in raised position, as shown in Fig. 10. The mantle M being rolled up at the lower part, as shown in Fig. 15, is slipped downward over the central folders and tension-blade and the central folders returned into their normal position intermediate between the reciprocating side folders, as shown in Figs. 1 and 2. In this position the central folders B are locked by the pawl-and-ratchet mechanism arranged in connection with the angular lever $B^5$. The machine is now set in motion by turning the main gear-wheel G, from which motion is transmitted to the cam-shafts E', screw-spindle F, and needle-bar C in the manner before described. The cylindrical cams E on the cam-shaft E' advance simultaneously with the needles S S. The cams E E engage one pair of side folders D D' after the other by their segmentally-recessed end and press said folders slowly toward each other so as to form one fold after the other in the head of the mantle in connection with the central folders, as shown in Fig. 3. As the folding proceeds the needles pierce the folds and carry the threads through the folds as they are formed. When all the side folders are moved inwardly and all the folds are formed and the needles have pierced the same, the cams continue their motion, so as to give the needles a chance to pass fully through all the folds and permit the drawing through of the ends of the thread, as shown in Fig. 13. By the joint action of the central and side folders folds of uniform shape are formed at both sides of the central folders without injury to the mantle and in considerably less time than the same work can be done by hand. The ends of the shirring-threads are then cut off, the needles unthreaded, and the threads pulled through, as shown in Fig. 13. After this is done the motion of the driving-wheel is reversed, so that the motion of the cylindrical cams E, governing the side folders, is reversed, likewise the motion of the needles. The side folders are successively withdrawn as they are liberated by the cams E E and returned into their normal position by their springs $d^9$, while the needles follow gradually the receding motion of the side folders until they are entirely withdrawn from the folds of the mantle. After the folds of the mantle are cleared by the side folders and by the needles the side folders are lowered simultaneously with their supporting-carriers $D^5$ by turning the crank-handle $D^{10}$ below the main driving-wheel G, so that the cam $D^9$, acting on the bridge-strap $D^7$, moves both sets of side folders in downward direction, so as to crease the folds and permit in their lowered position the convenient removal of the folded and shirred mantle.

The advantages of my improved machine are that the mantles are folded and stitched in a perfectly reliable and uniform manner at considerable speed and without requiring skilled labor for completing the heads of the mantles.

Having thus described my invention, I claim as new and desire to secure by Letters Patent—

1. In means for inserting shirring-strings into incandescent mantles, the combination, with a set of central folders, of a set of parallel reciprocating side folders located intermediately with the central folders, longitudinally-reciprocating needles, and means for simultaneously operating said reciprocating side folders and advancing the needles for shirring the folds of the head of the mantle, substantially as set forth.

2. In means for inserting shirring-strings into incandescent mantles, the combination of a set of central folders, means for vertically reciprocating the same, a set of side folders at each side of said central folders, said side folders being arranged to alternate with the central folders, means for imparting reciprocating motion to said side folders successively one pair after the other, two needles arranged at right angles to the folders, and means for moving said needles forward simultaneously with the inward motion of said side folders, substantially as set forth.

3. In means for inserting shirring-strings into incandescent mantles, the combination with a set of central folders, of a platform for supporting said folders, a spring-actuated tension-blade arranged on said platform adjacent to said folders, means for guiding said tension-blade laterally to and from one end of said central folders, side folders coöperating with said central folders and needles for inserting a shirring-thread through the folded part of the mantle, substantially as set forth.

4. In means for inserting shirring-strings into incandescent mantles, the combination, with a set of parallel central folders, of a platform for supporting the same, means for guiding the platform, an angular lever for raising or lowering said platform, a pawl-and-ratchet device for locking said angular lever in position, side folders and needles for inserting a shirring-thread, substantially as set forth.

5. In means for inserting shirring-strings into incandescent mantles, the combination, with a set of central folders, of laterally-reciprocating side folders located intermediately to said central folders, carriers for supporting said side folders, means for guiding said carriers up and down, means for lowering said carriers and side folders when the head of the mantle is folded and shirred, and needles for inserting a shirring-thread, substantially as set forth.

6. In means for inserting shirring-strings into incandescent mantles, the combination, with a set of central folders, of intermediate laterally-reciprocating side folders, cylindrical cams having segmentally-recessed faces engaging successively one pair of side folders after the other, means for imparting rotary motion to said cams, and needles for inserting a shirring-thread, substantially as set forth.

7. In means for inserting shirring-strings into incandescent mantles, the combination, with a set of central folders, of sets of laterally-reciprocating side folders, said central and side folders being recessed at their upper parts, longitudinally-reciprocating needles, and means for imparting motion to said needles simultaneously with the reciprocating motion imparted to said side folders, substantially as set forth.

8. In means for inserting shirring-strings into incandescent mantles, the combination, with a set of central folders, of two sets of laterally-reciprocating and spring-actuated side folders, guide-combs for guiding said side folders, rotary and longitudinal traversing cam-sleeves having segmental faces for imparting successively motion toward each other to one pair of side folders after the other, and needles for inserting a shirring-thread, substantially as set forth.

9. In means for inserting shirring-strings into incandescent mantles, a side folder formed of an oblong lower part or shank and an angular upper part provided with a recess at its upper corner in combination with central folders, and a needle guided in said recess, substantially as set forth.

10. In means for inserting shirring-strings into incandescent mantles, the combination of a set of central folders, a guided and spring-actuated tension-blade parallel with said central folders for holding the mantle-blank in position on said folders, laterally-reciprocating side folders arranged intermediately to said central folders, said central and side folders being provided with needle-recesses in their upper ends, and a pair of longitudinally-reciprocating needles adapted to pierce successively the folds in the mantle-head, substantially as set forth.

In testimony that I claim the foregoing as my invention I have signed my name in presence of two subscribing witnesses.

BRUNO VON BÜLTZINGSLÖWEN.

Witnesses:
PAUL GOEPEL,
M. HENRY WURTZEL.